US012596022B2

(12) United States Patent
Klein

(10) Patent No.: US 12,596,022 B2
(45) Date of Patent: Apr. 7, 2026

(54) CLAMPING SLEEVE FOR MOUNTING A ROTATION SENSOR, AND ROTATION SENSOR ARRANGEMENT AND ROTATION SENSOR SYSTEM HAVING SUCH A CLAMPING SLEEVE

(71) Applicant: KNORR-BREMSE Systeme fuer Nutzfahrzeuge GmbH, Munich (DE)

(72) Inventor: Guenter Klein, Unterensingen (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 282 days.

(21) Appl. No.: 18/281,459

(22) PCT Filed: Mar. 3, 2022

(86) PCT No.: PCT/EP2022/055370
§ 371 (c)(1),
(2) Date: Sep. 11, 2023

(87) PCT Pub. No.: WO2022/189244
PCT Pub. Date: Sep. 15, 2022

(65) Prior Publication Data
US 2024/0159575 A1     May 16, 2024

(30) Foreign Application Priority Data
Mar. 12, 2021   (DE) .................... 10 2021 202 438.6

(51) Int. Cl.
*G01D 11/30*          (2006.01)
(52) U.S. Cl.
CPC .................................. *G01D 11/30* (2013.01)

(58) Field of Classification Search
CPC ...................................................... G01D 11/30
See application file for complete search history.

(56) References Cited

U.S. PATENT DOCUMENTS 6,222,292 B1 *   4/2001   Smith ..................... F16D 1/112
                                                              310/91
9,267,856 B2 *   2/2016   Mokhbery ................ G01L 3/14
                          (Continued)

FOREIGN PATENT DOCUMENTS

CA        3112067 A1 *   9/2021   ............. G01P 3/488
DE        32 29 207 A1   4/1984
                          (Continued)

OTHER PUBLICATIONS

International Preliminary Report on Patentability (PCT/IB/326 & PCT/IB/373) issued in PCT Application No. PCT/EP2022/055370 dated Sep. 21, 2023, including English translation of Written Opinion (PCT/ISA/237) (8 pages).
                          (Continued)

*Primary Examiner* — Jamel E Williams
(74) *Attorney, Agent, or Firm* — Crowell & Moring LLP

(57)          ABSTRACT

A clamping sleeve mounts a rotation sensor in a receiving opening which is provided in a receiving device and which has a longitudinal axis parallel to an intended mounting direction. The clamping sleeve is designed to be inserted at least partially into the receiving opening in the direction of the longitudinal axis and to be held therein by frictional engagement. The clamping sleeve is further designed corresponding to the rotation sensor to be mounted, such that, upon insertion of the rotation sensor into the clamping sleeve, a form-fit engagement between the rotation sensor and the clamping sleeve can be established.

13 Claims, 1 Drawing Sheet

(56)     References Cited

U.S. PATENT DOCUMENTS

| | | | | |
|---|---|---|---|---|
| 10,844,895 | B2 * | 11/2020 | Kluftinger | F16B 21/07 |
| 2015/0331005 | A1 * | 11/2015 | Dalisdas | G01P 3/488 |
| | | | | 701/72 |
| 2021/0148945 | A1 * | 5/2021 | Blessing | G01P 1/026 |
| 2021/0300111 | A1 * | 9/2021 | Zhou | G01P 3/487 |
| 2022/0404385 | A1 * | 12/2022 | Hauff | G01P 1/00 |

FOREIGN PATENT DOCUMENTS

| | | | | | |
|---|---|---|---|---|---|
| DE | 102008058204 | A1 * | 5/2010 | | H01R 13/187 |
| DE | 102012024762 | A1 * | 6/2014 | | G01D 11/30 |
| DE | 10 2013 000 204 | A1 | 7/2014 | | |
| DE | 102013213243 | A1 * | 9/2014 | | G01N 27/4077 |
| DE | 10 2017 113 604 | A1 | 12/2018 | | |
| DE | 10 2019 125 405 | A1 | 3/2021 | | |
| WO | WO 2006/047899 | A1 | 5/2006 | | |

OTHER PUBLICATIONS

International Search Report (PCT/ISA/210) issued in PCT Application No. PCT/EP2022/055370 dated Jun. 3, 2022 with English translation (5 pages).
German-language Written Opinion (PCT/ISA/237) issued in PCT Application No. PCT/EP2022/055370 dated Jun. 3, 2022 with English translation (9 pages).
German-language Office Action issued in German Application No. 10 2021 202 438.6 dated Nov. 24, 2021 (7 pages).

* cited by examiner

CLAMPING SLEEVE FOR MOUNTING A ROTATION SENSOR, AND ROTATION SENSOR ARRANGEMENT AND ROTATION SENSOR SYSTEM HAVING SUCH A CLAMPING SLEEVE

BACKGROUND AND SUMMARY

The invention relates to a clamping sleeve for mounting a rotation sensor in a receiving opening which is provided in a receiving device, and to a rotation sensor arrangement and a rotation sensor system having such a clamping sleeve.

Active speed sensors require an antirotation safeguard to ensure correct direction detection. For this purpose, the rotation sensor is screwed, for example, into a receiving opening of a receiving device or into a receiving seat located in the receiving opening, or has positive engagement elements corresponding thereto. In order to reduce the amount of change involved in providing the positive engagement in each case, it is alternatively possible to use rotation sensors that do not require an antirotation safeguard in order to ensure correct direction detection. However, such rotation sensors require a complex and comparatively cost-intensive sensor system.

In view of the above, it is therefore an object of the invention to provide an antirotation safeguard for a rotation sensor, by means of which the respective amount of adaptation is reduced.

The object is achieved by a clamping sleeve for mounting a rotation sensor, a rotation sensor arrangement and a rotation sensor system as claimed in the independent claims. Advantageous developments of the invention are contained in the dependent claims.

According to the invention, a clamping sleeve for mounting a rotation sensor in a receiving opening which is provided in a receiving device and which has a longitudinal axis, about which a lateral surface of the clamping sleeve extends in the direction of the longitudinal axis, at least in some section or sections, is designed to be inserted at least partially into the receiving opening and to be held therein by frictional engagement, and the clamping sleeve is moreover designed so as to correspond to the rotation sensor to be mounted, such that, upon insertion of the rotation sensor into the clamping sleeve, positive engagement can be established between the rotation sensor and the clamping sleeve.

Accordingly, the rotation sensor is secured against rotation in a receiving opening of a receiving device for the rotation sensor by means of the clamping sleeve, which establishes at least frictional engagement with the receiving opening and at least positive engagement with the rotation sensor. In other words, the rotation sensor can be held securely against rotation in the receiving opening by means of a combination of frictional engagement and positive engagement. According to this combination, the already existing clamping sleeve can serve as an antirotation safeguard through slight adaptation, and it is therefore possible to dispense with additional positive engagement elements, such as extra sleeves, or positive engagement contouring of the receiving opening of the receiving device, which has to be provided individually in each case.

The positive engagement between the clamping sleeve and the rotation sensor is to be provided at least in a direction in which the antirotation safeguard is to be provided. If the direction of the antirotation safeguard is to be provided corresponds, for example, to a direction of rotation about the longitudinal axis of the clamping sleeve, at least positive engagement in this direction must be provided.

With respect to the longitudinal axis, it should also be noted that this is indicated here in relation to the clamping sleeve or its lateral surface, which surrounds the longitudinal axis at least in some section or sections. However, the longitudinal axis of the clamping sleeve also equally defines a longitudinal axis of the rotation sensor and of the receiving device or receiving opening. In other words, the longitudinal axis of the clamping sleeve is also the longitudinal axis of the rotation sensor and of the receiving device in a rotation sensor system that will be described later. The relationship to the axis that is evident from the rotation sensor system is taken over for the individual components.

In one embodiment, the clamping sleeve has a slot in the direction of the longitudinal axis, at least in some section or sections, and this slot is open at least on a side facing the rotation sensor during assembly.

By means of the mutually facing side of the slot, which extends in the direction of the longitudinal axis, it is a simple matter to form a positive engagement section of the clamping sleeve, which is designed to receive a corresponding positive engagement section of the rotation sensor. Since the clamping sleeve is held in the receiving opening of the receiving device by frictional engagement when mounted therein, the engagement of the positive engagement section of the rotation sensor in the slot makes it possible to prevent rotation, thus ensuring that the rotation sensor cannot rotate about the longitudinal axis.

For the insertion of the rotation sensor or positive engagement element section of the rotation sensor, the slot is open at least on the side facing the rotation sensor during assembly. If the slot is open on both sides of the clamping sleeve, i.e. is a through slot, the rotation sensor can be inserted into the clamping sleeve from both sides. Moreover, the rotation sensor can be positioned in a flexible manner in the axial direction in the clamping sleeve. However, provision can also be made to provide the slot in the clamping sleeve only over a predetermined length in the direction of the longitudinal axis. That end of the slot which faces away from the open end can then be used, for example, as a stop for the rotation sensor or positive engagement section of the rotation sensor, defining a predetermined mounting position of the rotation sensor in the clamping sleeve in the direction of the longitudinal axis.

In particular, the slot has a radially inwardly inclined end section at least on one of the sides extending in the direction of the longitudinal axis, in particular on both sides, at least in some section or sections.

The inwardly inclined end section makes it possible to compensate for tolerances in the radial direction with respect to the longitudinal axis. Accordingly, the positive engagement section of the rotation sensor can be brought into engagement with the clamping sleeve with greater certainty. Alternatively or in addition, the clamping sleeve can also have a greater radial extent, i.e. wall thickness, in the region of the slot.

According to a further development, the inwardly inclined end section is of elastic or resilient design.

In other words, the inwardly inclined end section has an extent, in particular a radial extent, which is of elastic or resilient design. The inwardly inclined end section preferably has a radial extent of 1 mm or less. Here, the radial extent of the inwardly inclined end sections does not correspond to the length of the inclined end sections but to the radial distance, with respect to the longitudinal axis, between those ends of the inclined end section which adjoin the lateral surface and the end facing away therefrom. In other words, the radial distance can be given as $x*\sin(\alpha)$, where x corresponds to the length of the end section from an end facing the lateral surface to an end facing away therefrom, and α is the angle of inclination between the outer lateral surface and the inclined end section.

The elastic or resilient radial extent makes it possible to provide sufficient tolerance compensation without, for example, in the case of a rotation sensor which is cylindrical as far as the positive engagement section, having to take into account a significant eccentricity of the rotation sensor, or without a circumferential supporting surface for the rotation sensor being significantly reduced by the clamping sleeve. By means of this tolerance compensation, it is possible to achieve an antirotation safeguard with a radial extent of 1 mm or less. Thus, the amount of change involved in converting to an active speed sensor is less. The positive engagement section on the rotation sensor can be made lower than without an elastic extent.

In one embodiment, the clamping sleeve has, at least in some section or sections, a clamping sleeve projection on an end section that is axial with respect to the longitudinal axis, said clamping sleeve projection projecting radially outward with respect to the longitudinal axis.

The clamping sleeve projection, which projects radially outward with respect to the longitudinal axis, can serve as a stop for the mounting of the clamping sleeve in the receiving opening of the receiving device, ensuring that the clamping sleeve does not exceed a predetermined relative position in the receiving opening in the direction of the longitudinal axis. If the clamping sleeve is configured in such a way that a specified mounting direction is to be complied with, this can also be identified directly visually from the radial clamping sleeve projection. In such a case, it would, for example, be the end of the clamping sleeve that faced away from the end section having the radial clamping sleeve projection that would have to be inserted first into a bore as a receiving opening.

In the case of its formation over only a section or sections, the radial clamping sleeve projection can also be brought into positive engagement with a corresponding recess on the end face facing the clamping sleeve as the latter is inserted, making it possible by this means to provide positionally oriented mounting of the clamping sleeve in the receiving opening, as will be taken up again later in the context of a mounting aid.

The radial clamping sleeve projection can form an end face at the end of the clamping sleeve, but it can also be set back from such an end face in the direction of the longitudinal axis within the end section.

In one embodiment, the clamping sleeve has at least one spring element on its lateral surface.

Such a spring element can produce at least a radially outwardly acting spring force with respect to the longitudinal axis, for example, in order to produce or assist the frictional engagement between the clamping sleeve and the receiving opening. Alternatively or additionally, however, the spring element can also be configured in such a way that it applies at least a radially inwardly acting spring force in order to allow not only positive engagement between the clamping sleeve and the rotation sensor but also frictional engagement in order, for example, to relieve the load on the positive engagement elements or to provide an additional antirotation safeguard.

In a further development, the clamping sleeve has a mounting aid for positionally oriented mounting in the receiving opening.

The mounting aid is designed in such a way that the clamping sleeve can be mounted in a positionally oriented manner in the receiving opening of the receiving device, i.e. can be inserted at a predetermined angular position with respect to the longitudinal axis. Thus, when the rotation sensor is being mounted, the angular position of the rotation sensor with respect to the longitudinal axis is then defined by way of the position of the positive engagement section of the clamping sleeve and the corresponding positive engagement section of the rotation sensor. The mounting aid for the positionally oriented mounting of the clamping sleeve in the receiving opening can be formed by optical, mechanical and/or electric orientation aids.

In particular, the mounting aid is formed from a mandrel, which protrudes out of the receiving opening in the position of use and has a spirit level attached thereto.

The spirit level, as an optical mounting aid, is provided at a position of the clamping sleeve, for example, in which a bubble or an indicator corresponding thereto is located precisely between the limit indications in a predetermined positionally oriented mounting position of the clamping sleeve. It is also possible to use spirit levels that have several axes.

Alternatively or additionally, the mounting aid is formed from a mandrel with a template attached thereto.

The template is matched in such a way to parts of the geometry of the housing in which the rotation sensor is installed that the mandrel with the clamping sleeve can only be inserted into the bore in the envisaged angular position.

As a further alternative or addition, the mounting aid establishes positive engagement with the receiving device.

Corresponding positive engagement via the projecting radial clamping sleeve projection in interaction with a corresponding recess in the receiving opening can also be used as a mounting aid, for example. The radial clamping sleeve projection can thus be used, in particular, as a mounting aid and as a stop.

In a further development of the clamping sleeve, the mounting aid is detachably connected to the clamping sleeve.

By means of the detachable connection between the clamping sleeve and the mounting aid, it is possible to remove interfering contours caused, for example, by the mounting aid after the positionally oriented mounting of the clamping sleeve in the receiving opening. Here, the concept of detachable connection is not limited to connections that can be detached without destruction, but can also comprise predetermined breaking points and the like. With a view to reusability, however, depending on complexity and thus costs, connections that can be detached without destruction are preferable, such as those that can be provided, by way of example, by screw-on mounting aids.

In a further aspect, the invention relates to a rotation sensor arrangement which has an above-described clamping sleeve and a rotation sensor which is designed to be inserted at least partially into the clamping sleeve in the direction of the longitudinal axis, wherein the rotation sensor has, at least in some section or sections, a rotation sensor projection which projects radially outward with respect to the longitudinal axis, thus enabling positive engagement to be established between the rotation sensor and the clamping sleeve via the rotation sensor projection when the rotation sensor is inserted into the clamping sleeve.

The radial rotation sensor projection of the rotation sensor thus serves as a positive engagement section of the rotation sensor, which can be brought into engagement with a corresponding positive engagement section of the clamping sleeve to safeguard against rotation about the longitudinal axis. Here, the radial rotation sensor projection can be designed as a pin or else as a radial rotation sensor projection extending in the direction of the longitudinal axis, i.e. in the axial direction. If one or more radial rotation sensor projections interact in the direction of the longitudinal axis with a plurality of surfaces of the positive engagement section of the clamping sleeve in a manner secure against rotation, tipping of the rotation sensor in the clamping sleeve can be prevented, something that could lead to tilting of the rotation sensor in the clamping sleeve with corresponding play. Alternatively or additionally, the rotation sensor can also have at least one recess, in which there engages at least one clamping sleeve projection that faces radially inward with respect to the longitudinal axis and is designed in such a way that it establishes positive engagement with the recess.

According to one embodiment, the rotation sensor projection extends in the direction of the longitudinal axis at least over a section which establishes the positive engagement with the clamping sleeve in a predetermined position of use.

For example, the rotation sensor arrangement can be designed in such a way that positive engagement between the clamping sleeve and the rotation sensor does not take place over the entire possible mounting travel along the longitudinal axis but only in a predetermined position of use, that is to say a predetermined relative position between the clamping sleeve and the rotation sensor. Accordingly, an antirotation safeguard can no longer be provided in front of and behind the predetermined position of use. In such a case, the appropriate positioning of the rotation sensor in the clamping sleeve for use can thus be checked from the presence of the antirotation safeguard or indeed the absence thereof and hence at least a certain capacity for rotation. For example, a slot provided for positive engagement in the clamping sleeve can taper from a receiving side for the rotation sensor in the direction of the longitudinal axis and only establish positive engagement with the radial rotation sensor projection after a predetermined insertion distance. Until the rotation sensor has been inserted sufficiently far into the clamping sleeve, there is thus still a certain capacity for rotation. According to another example, the radial rotation sensor projection and/or the positive engagement section of the clamping sleeve can also each be formed only in a predetermined region, wherein the regions have to be brought into overlap for positive engagement. The length of the overlap region corresponds to the possible predetermined positions of use. It is also possible for there to be a plurality of overlap regions along the longitudinal axis if a plurality of predetermined positions of use is to be provided.

The invention furthermore relates to a rotation sensor system which has an above-described clamping sleeve, a rotation sensor as per the above-described rotation sensor arrangement, and a receiving device having at least one receiving opening extending in the direction of the longitudinal axis, wherein the clamping sleeve is held secure against rotation in the receiving opening at least via frictional engagement and the rotation sensor is held secure against rotation in the receiving opening at least via positive engagement with the clamping sleeve.

As already explained above, the arrangement and configuration of the clamping sleeve in the receiving opening results in frictional engagement, with the result that the rotation sensor is held secure against rotation upon positive engagement in the clamping sleeve. Advantages and embodiments will become apparent by analogy with the above statements.

In one embodiment, the receiving opening is a through opening in the direction of the longitudinal axis.

The rotation sensor can thus protrude from the receiving opening on the side facing away from the side on which the rotation sensor is inserted into the receiving device or receiving opening and can thus be brought as close as possible to a measurement location. Alternatively, however, it is also possible for the receiving opening not to be designed as a through opening, with the result that the side of the receiving opening which faces away from the insertion side is closed or at least smaller than the inserted end of the rotation sensor in order to protect the latter and/or to form a stop for the latter in accordance with a predetermined position of use.

The invention is explained in more detail below by means of an embodiment with reference to the accompanying figures.

DETAILED DESCRIPTION OF THE DRAWINGS

Figures 1, 2:
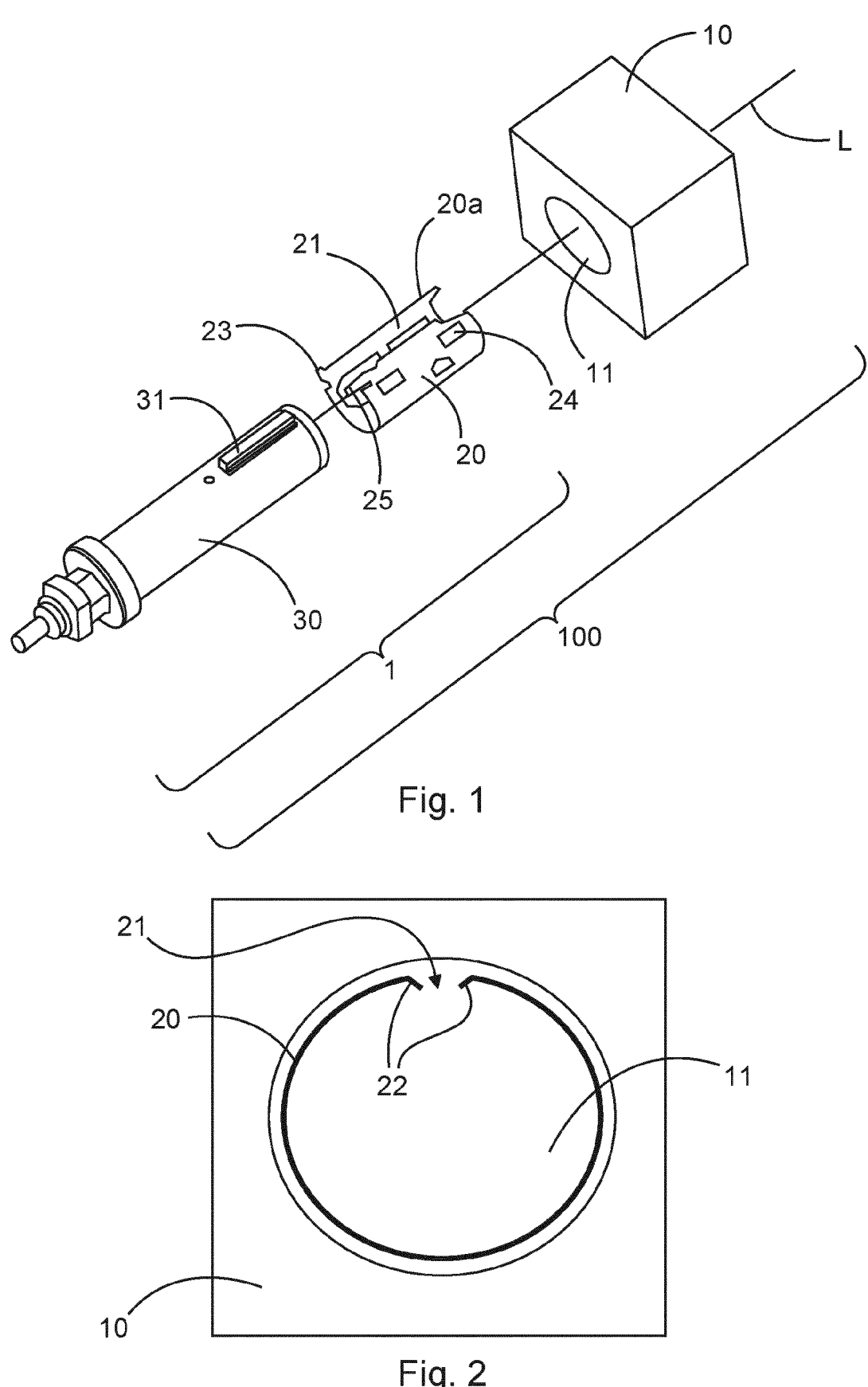
FIG. 1 is a perspective view of a rotation sensor system having a clamping sleeve according to a first embodiment of the invention.
FIG. 2 is a cross-sectional view of the receiving device with the clamping sleeve according to FIG. 1 mounted therein, in a section plane perpendicular to the longitudinal axis.

FIG. 1 shows a perspective view of a rotation sensor system 100 according to a first embodiment of the invention. The rotation sensor system 100 comprises a receiving device 10 having a receiving opening 11, which is designed as a through opening and extends along a longitudinal axis L. In addition, the rotation sensor system 100 comprises a rotation sensor arrangement 1, which has a clamping sleeve 20 and a rotation sensor 30. A lateral surface 20a of the clamping sleeve 20 extends around the longitudinal axis L in the axial direction and forms a slot 21, which likewise runs in the axial direction and, in this embodiment, is open in the direction of the longitudinal axis on both sides of the clamping sleeve and has a constant clearance. On a side of the clamping sleeve 20 which faces away from the receiving opening 11, this furthermore has a radial, outward-projecting clamping sleeve projection 23, which serves as a stop, with the result that the insertion travel of the clamping sleeve into the receiving opening 11 is limited by means of the radial clamping sleeve projection 23. A mounting aid 25 is furthermore provided on the side of the radial clamping sleeve projection 23. This mounting aid 25 is designed as a projection which points in the direction of the longitudinal axis and is to be brought into overlap with a marking (not shown here) on that side of the receiving device 10 which faces the clamping sleeve when the clamping sleeve 20 is inserted into the receiving opening 11, in order to mount said sleeve in the correct position. Furthermore, the lateral surface 20a forms spring elements 24, the spring force of which in each case acts outward at least in the radial direction with respect to the longitudinal axis L in order to assist the frictional engagement of the clamping sleeve 20 in the receiving opening 11. With regard to the frictional engagement, the clamping sleeve 20 is furthermore configured in such a way that it is elastically compressed when inserted into the receiving opening 11, in order likewise to establish frictional engagement, at least in some section or sections, by means of the elastic restoring force. Alternatively, the clamping sleeve 20 can be pressed into the receiving opening 11.

In order to establish positive engagement with the clamping sleeve 20, the rotation sensor 30 has a rotation sensor projection 31 which projects radially outward with respect to the longitudinal axis L. The width of the rotation sensor projection in the circumferential direction corresponds to the width of the slot 21, which will be explained in more detail with reference to FIG. 2, in order to establish positive engagement therewith for the rotationally secure retention of the rotation sensor 30 in the clamping sleeve 20. Accordingly, the rotation sensor 30 should only be inserted into the clamping sleeve 20 to such an extent that the rotation sensor projection 31 has an overlap region with the slot 21.

In respect of the design of the slot 21 of the clamping sleeve 20 for positive engagement with the rotation sensor projection 31, FIG. 2 shows a cross-sectional view of the receiving device 10 with the clamping sleeve 20 according to FIG. 1 mounted in the receiving opening 11 in a section plane perpendicular to the longitudinal axis L. Even if the clamping sleeve 20 is shown here as being spaced apart from the receiving opening 11, the clamping sleeve 20 is to be understood as being connected to the receiving opening 11 by frictional engagement. Alternatively, provision can also be made for the frictional engagement to come about only with the insertion of the rotation sensor 30 and an associated spreading apart of the clamping sleeve 20. On its respective opposite sides, which extend in the direction of the longitudinal axis L, the slot 21 is delimited by inclined end sections 22 of the clamping sleeve 20, which extend radially inward with respect to the longitudinal axis L. In contrast to end sections that are not inclined, this ensures that the region of positive engagement between the rotation sensor projection 31 and the end sections 22 is offset radially inward in the direction of the longitudinal axis in accordance with the length and the inclination angle of the end sections 22. Tolerance compensation in the radial direction is accomplished thereby. If the inclined end sections are of deformable design, that is to say can be moved in the circumferential direction in respective opposite directions relative to the slot 21, tolerance compensation can also be accomplished in the width direction of the radial rotation sensor projection 31.

The invention is not restricted to the embodiments described. Even if the slot 21 is designed as a through slot in accordance with the first embodiment presented, it may be provided only over a predetermined insertion distance, starting from the side for the insertion of the rotation sensor 30. The end of such a slot can thus be used as a stop for the rotation sensor 30 or the radial rotation sensor projection 31 in a predetermined position of use or as some other insertion limiting means. Moreover, features that are described can be combined with one another in any desired way, provided they are not mutually exclusive on reasonable grounds. Thus, alternatively or additionally, the spring elements 24 can apply a radially inwardly directed spring force and/or can also be used as a mounting aid if, for example, the circumferential surface of the receiving opening 11 has corresponding spring element receptacles.

LIST OF REFERENCE SIGNS

1 rotation sensor arrangement
10 receiving device
11 receiving opening
20 clamping sleeve
20*a* lateral surface
21 slot
22 inwardly inclined end section

23 clamping sleeve projection
24 spring element
25 mounting aid
30 rotation sensor
31 rotation sensor projection
100 rotation sensor system
L longitudinal axis

The invention claimed is:

1. A clamping sleeve for mounting a rotation sensor in a receiving opening which is provided in a receiving device and which has a longitudinal axis, comprising: a lateral surface of the clamping sleeve that extends in a direction of the longitudinal axis, at least in some section or sections, wherein the clamping sleeve is configured to be inserted at least partially into the receiving opening and to be held therein by frictional engagement, and the clamping sleeve is configured so as to correspond to the rotation sensor to be mounted, such that, upon insertion of the rotation sensor into the clamping sleeve, positive engagement is established between the rotation sensor and the clamping sleeve; wherein the clamping sleeve has a slot in the direction of the longitudinal axis, at least in some section or sections, and said slot is open at least on a side facing the rotation sensor during assembly; wherein the slot has a radially inwardly inclined end section on both sides of the slot extending in the direction of the longitudinal axis, and the end sections are configured such that the positive engagement is established between the rotation sensor projection of the rotation sensor when the rotation sensor is inserted into the clamping sleeve.

2. The clamping sleeve as claimed in claim 1, wherein the inwardly inclined end section is of elastic or resilient design.

3. The clamping sleeve as claimed in claim 1, wherein the clamping sleeve has, at least in some section or sections, a clamping sleeve projection on an end section that is axial with respect to the longitudinal axis, said clamping sleeve projection projecting radially outward with respect to the longitudinal axis.

4. The clamping sleeve as claimed in claim 1, wherein the clamping sleeve has at least one spring element on a lateral surface thereof.

5. The clamping sleeve as claimed in claim 1, wherein the clamping sleeve has a mounting aid for positionally oriented mounting in the receiving opening.

6. The clamping sleeve as claimed in claim 5, wherein the mounting aid is formed from a mandrel, which protrudes out of the receiving opening in a position of use and has a spirit level attached thereto.

7. The clamping sleeve as claimed in claim 5, wherein the mounting aid is formed from a mandrel with a template attached thereto.

8. The clamping sleeve as claimed in claim 5, wherein the mounting aid establishes positive engagement with the receiving device.

9. The clamping sleeve as claimed in claim 5, wherein the mounting aid is detachably connected to the clamping sleeve.

10. A sensor arrangement, comprising:
a rotation sensor;
a clamping sleeve, wherein
a lateral surface of the clamping sleeve extends in a direction of the longitudinal axis, at least in some section or sections,
the clamping sleeve is configured to be insertable at least partially into a receiving opening and to be holdable therein by frictional engagement,
the clamping sleeve is configured so as to correspond to the rotation sensor to be mounted, such that, upon insertion of the rotation sensor into the clamping sleeve, positive engagement is established between the rotation sensor and the clamping sleeve, the rotation sensor is insertable at least partially into the clamping sleeve in the direction of the longitudinal axis, and the rotation sensor has, at least in some section or sections, a rotation sensor projection which projects radially outward with respect to the longitudinal axis, thus enabling positive engagement to be established between the rotation sensor and the clamping sleeve via the rotation sensor projection when the rotation sensor is inserted into the clamping sleeve, wherein the slot has a radially inwardly inclined end section on both sides of the slot extending in the direction of the longitudinal axis, and the end sections are configured such that the positive engagement is established between the rotation sensor and the clamping sleeve via a rotation sensor projection of the rotation sensor when the rotation sensor is inserted into the clamping sleeve.

11. The sensor arrangement as claimed in claim 10, wherein the rotation sensor projection extends in the direction of the longitudinal axis at least over a section which establishes the positive engagement with the clamping sleeve in a predetermined position of use.

12. A rotation sensor system, comprising:

a rotation sensor;

a receiving device having at least one receiving opening extending in a direction of a longitudinal axis, a clamping sleeve, wherein a lateral surface of the clamping sleeve extends in a direction of the longitudinal axis, at least in some section or sections, the clamping sleeve is configured to be inserted at least partially into the receiving opening and to be held therein by frictional engagement, the clamping sleeve is configured so as to correspond to the rotation sensor to be mounted, such that, upon insertion of the rotation sensor into the clamping sleeve, positive engagement is established between the rotation sensor and the clamping sleeve, and the clamping sleeve is held secure against rotation in the receiving opening at least via frictional engagement, and the rotation sensor is held secure against rotation in the receiving opening at least via positive engagement with the clamping sleeve, wherein the slot has a radially inwardly inclined end section on both sides of the slot extending in the direction of the longitudinal axis, and the end sections are configured such that the positive engagement is established between the rotation sensor and the clamping sleeve via a rotation sensor projection of the rotation sensor when the rotation sensor is inserted into the clamping sleeve.

13. The rotation sensor system as claimed in claim 12, wherein the receiving opening is a through opening in the direction of the longitudinal axis.

* * * * *